(12) United States Patent
Crampton

(10) Patent No.: US 8,695,447 B2
(45) Date of Patent: Apr. 15, 2014

(54) PROBE END MODULE FOR ARTICULATED ARMS

(75) Inventor: Stephen James Crampton, London (GB)

(73) Assignee: Nikon Metrology N.V., Heverlee (BE)

( * ) Notice: Subject to any disclaimer, the term of this patent is extended or adjusted under 35 U.S.C. 154(b) by 1189 days.

(21) Appl. No.: 11/667,198

(22) PCT Filed: Nov. 1, 2005

(86) PCT No.: PCT/GB2005/004214
§ 371 (c)(1),
(2), (4) Date: Mar. 17, 2008

(87) PCT Pub. No.: WO2006/051264
PCT Pub. Date: May 18, 2006

(65) Prior Publication Data
US 2008/0289204 A1    Nov. 27, 2008

(30) Foreign Application Priority Data
Nov. 9, 2004  (GB) .................................. 0424729.2

(51) Int. Cl.
*G01D 21/00* (2006.01)
(52) U.S. Cl.
USPC ........................................................ 73/866.5
(58) Field of Classification Search
USPC ......... 73/866.5, 558; 33/558, 503; 901/16–18
See application file for complete search history.

(56) References Cited

U.S. PATENT DOCUMENTS

| 5,152,072 | A | 10/1992 | McMurtry et al. | 33/558 |
| 5,918,378 | A * | 7/1999 | McMurtry et al. | 33/556 |
| 6,718,647 | B2 * | 4/2004 | Trull et al. | 33/558 |
| 7,395,606 | B2 | 7/2008 | Crampton | |
| 7,591,078 | B2 | 9/2009 | Crampton | |
| 7,954,250 | B2 | 6/2011 | Crampton | |
| 2005/0166413 | A1 | 8/2005 | Crampton | |
| 2008/0235970 | A1 | 10/2008 | Crampton | |
| 2009/0013548 | A1 * | 1/2009 | Ferrari | 33/503 |

FOREIGN PATENT DOCUMENTS

| WO | WO 03/069266 A2 | 8/2003 |
| WO | 2004096502 A1 | 11/2004 |

OTHER PUBLICATIONS

Renishaw, "Phiom Motorised Probe Head" 2003, XP002362134.
Renishaw, "MH20 and MH20i Manual Adjustable Probe Heads with Module Changing" 2001, XP 002362135.

* cited by examiner

*Primary Examiner* — Peter Macchiarolo
*Assistant Examiner* — Tamiko Bellamy
(74) *Attorney, Agent, or Firm* — Amster, Rothstein & Ebenstein LLP

(57) ABSTRACT

A probe end module system for an arm comprising: a probe end module having an arm end and an opposing probe end; a module-arm interface located at the arm end; at least one module-probe interface located at the probe end; the arm further comprising a movable member and a movable position reporting device.

13 Claims, 3 Drawing Sheets

US 8,695,447 B2

PROBE END MODULE FOR ARTICULATED ARMS

This is a U.S. national phase of PCT Application No. PCT/GB2005/004214, filed Nov. 1, 2005 and claims priority to GB Application No. 0424729.2, filed Nov. 9, 2004.

FIELD OF THE INVENTION

The present invention concerns a Probe End Module for Articulated Coordinate Measuring Machines (CMMs) to which probes attach.

BACKGROUND TO THE INVENTION

Existing Methods of Automated Measurement

Automated measurement of objects is currently carried out in two main ways: (i) a bulky, expensive, conventional Computer Numerically Controlled Coordinate Measuring Machine (CNC CMM) with 3 or more axes; (ii) a rigid structure of static Optical probes that is typically located in a dedicated cell at the end of the automotive production line. With a conventional CMM, the Optical probe moves in a highly controlled way around a static object to produce accurate data. In the second case, both Optical probes and object are static and localised in a calibrated way that permits accurate data. Most conventional CMMs are of either the moving bridge or horizontal arm structures; companies including Zeiss (Germany), Hexagon Brown&Sharpe (Sweden) and LK (UK) produce them. Mechanical touch probes for mounting on conventional CMMs are supplied by companies including Renishaw (UK). Optical probes for mounting on conventional CMMs are supplied by companies including Metris (Belgium). Automatic probe mounts such as the Renishaw Autojoint are repeatable to a high degree of accuracy and are supplied with a rack of probes for automatic probe changing. Rigid structures of static Optical probes are supplied by Perceptron (USA).

Existing Probe End Modules

Renishaw (UK) with the PH10M, Zeiss (Germany) and Mitutoyo (Japan) provide automated probe end modules to which contact probes such as touch trigger probes are attached. These Probe End Modules are limited to attaching just one probe and have two motorised axes. Optical probe manufacturers such as 3D Scanners (UK) and Metris (Be) have attached optical probes to probe end modules.

New Articulated Arm for Automated Measurement

A Robot CMM Arm with Exoskeleton is a new apparatus for automated measurement disclosed in PCT/GB2004/001827 by Crampton the inventor of this present invention.

SUMMARY OF THE INVENTION

In the prior art, probe end modules for 3-axis CMMs exist that contain two axes of motion. These are entirely suitable for 3-axis CMMs with 3 degrees of freedom. A Robot CMM Arm with Exoskeleton that is articulated with 6 degrees of freedom has now been invented. Existing probe end modules for 3 axis CMMs are not suitable for an articulated Robot CMM Arm with Exoskeleton principally because they have two axes where zero or one axes are required and also because there is only one probe interface for mounting one probe.

Accordingly, it is an objective of the present invention to provide a probe end module system for an arm comprising: a probe end module having an arm end and an opposing probe end; a module-arm interface located at the arm end; at least one module-probe interface located at the probe end; the arm further comprising a movable member and a movable position reporting device.

It is a further object of the present invention to provide a probe end module comprising: an arm end; an opposing probe end; a module-arm interface located at the arm end; a static module-probe interface located at the probe end such that there is no relative movement between the module-arm interface and the static module-probe interface; a rotatable module-probe interface located at the probe end; an axis of rotation between the module-arm interface and the rotatable module-probe interface.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

First Embodiment

The first embodiment of this Probe End Module for Articulated Arms invention is now disclosed. The Probe End Module mounts onto the Probe End of an automated Articulated Arm. One or more probes are mounted onto the Probe End Module. The Probe End Module has either zero or one axes of rotation. An automated articulated arm such as a 6-axis Robot CMM Arm is supplied with a Probe End Module such that a customer can convert a standard Robot CMM Arm from 6-axis to 7-axis by removing a 0-axis Probe End Module without an axis and replacing it with a Probe End Module with an additional axis. The Probe End Module concept has advantage to the supplier in that the supplier has one standard 6-axis Robot CMM Arm product that may be simply configured between 6-axis and 7-axis versions by shipping the appropriate Probe End Module. The concept has advantage to the user in that the user can purchase a Robot CMM Arm for 6-axis use and later upgrade to 7-axis use. The Probe End Module is situated at the far end of the Robot CMM Arm; the far end of the Robot CMM Arm is the location that is likely to be subject to most accidents in use. If the Probe End Module is damaged, it may be simply replaced, with little loss of production time. Without the Probe End Module concept, the Robot CMM Arm needs to be swapped out on a production line or cell and a more expensive repair process carried out either onsite or offsite.

Figure 1:
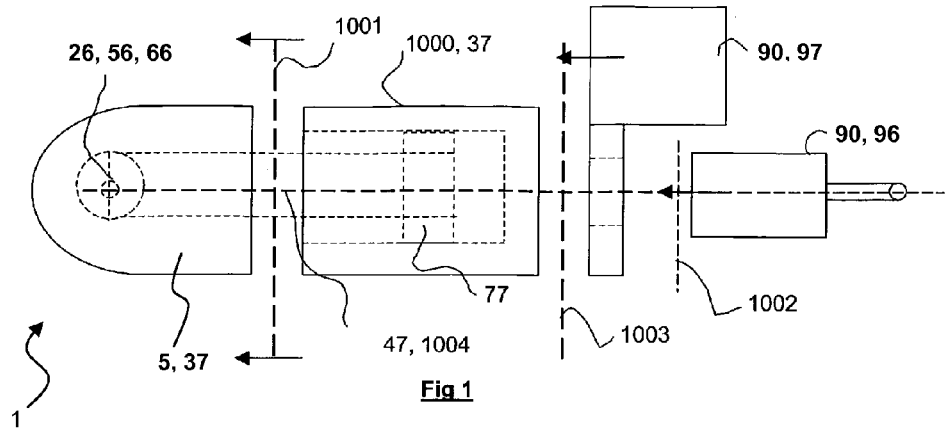
FIG. 1 is a schematic of the Probe End Module interfaces.
Figure 2:
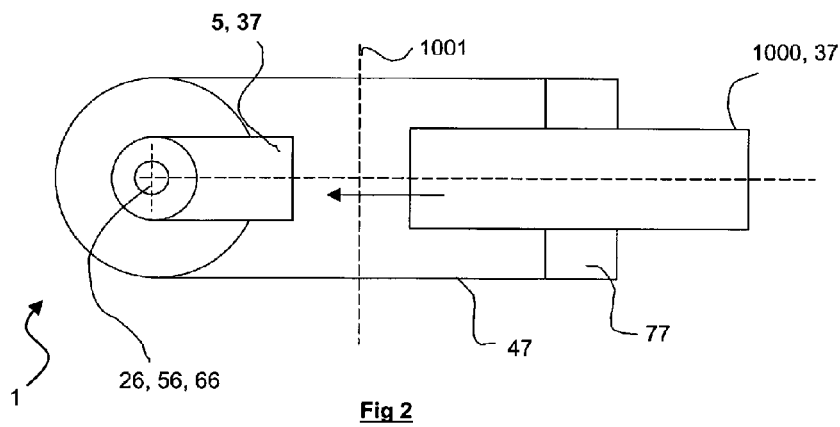
FIG. 2 is a diagram of the Probe End Module exoskeleton support.
Figure 3:
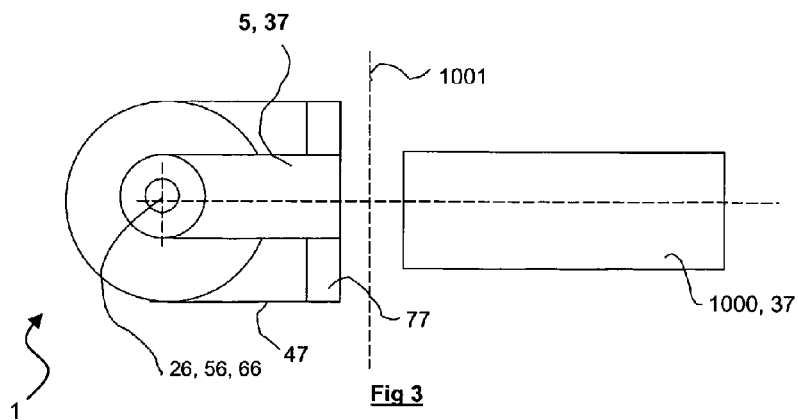
FIG. 3 is a diagram of the Probe End Module mounting.

The Probe End Module can be moved by the CMM using any of three broad embodiments:
Internal endoskeleton finger and transmission means;
External exoskeleton and transmission means;
Mounting interface;
as is now disclosed with reference to FIGS. 1,2,3 using a 0-axis Probe End Module but not limited to a 0-axis Probe End Module. Referring to FIG. 1, a Probe End Module 1000 is driven by an Internal endoskeleton finger 1004 through transmission means 77. The Probe End Module 1000 has three mounting interfaces: Arm Interface 1001, Contact Probe Interface 1002 and Optical Probe Interface 1003. The Probe End Module 1000 is rigidly mounted across Arm Interface 1001 to the Internal CMM Arm 5 at CMMSegment7 37 using appropriate removable fastening means such as bolts. Once mounted, the Probe End Module 1000 is effectively part of CMMSegment7 37. A common joint centre 26 between CMMSegment7 37 joint 56 and external exoskeleton (not shown) joint 66 is indicated. The Touch Trigger Probe 96 that is preferably of type Renishaw TP-20 is magnetically mounted across Contact Probe Interface 1002 to the Probe End Module 1000. Stripe Probe 97 which is preferably a 3D Scanners ModelMaker is mounted across Optical Probe Interface 1003 to the Probe End Module 1000. Referring now to FIG. 2, a Probe End Module 1000 is driven by ExoskeletonSegment7, 47 through transmission means 77. Referring now to FIG. 3, a Probe End Module 1000 is driven through its mounting Arm Interface 1001.

Figure 4:
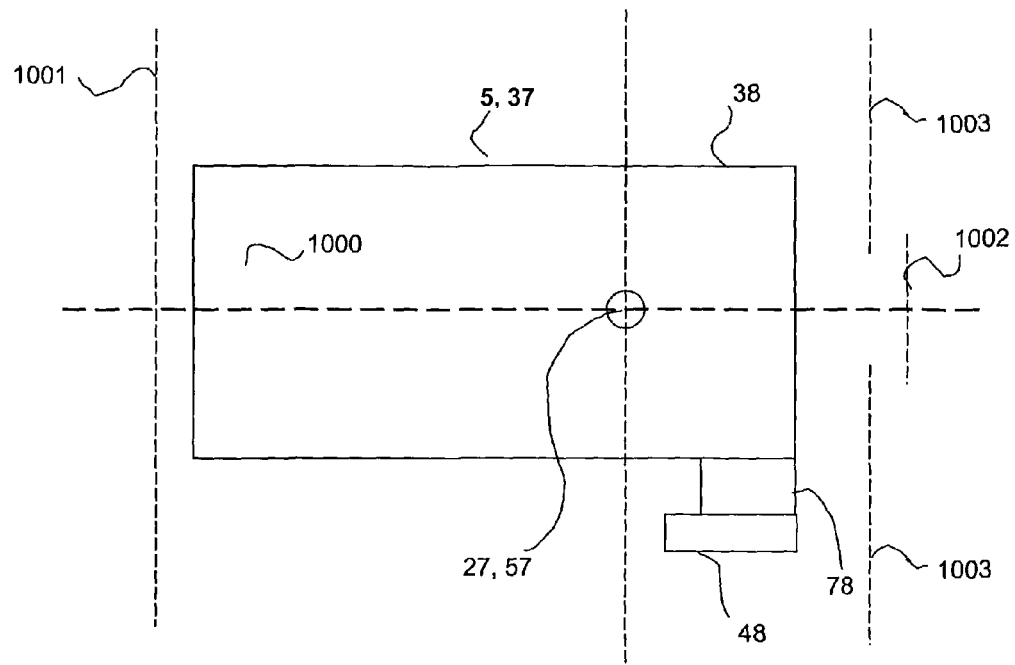
FIG. 4 is a diagram of the 1-axis Probe End Module.
Figure 5:
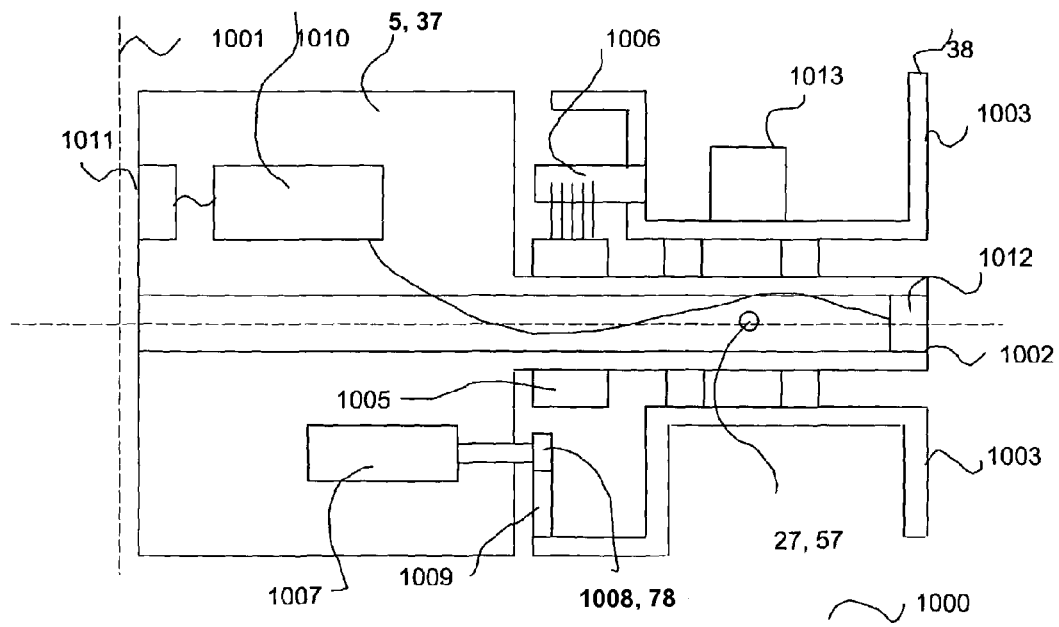
FIG. 5 is a section of the hybrid 0/1-axis Probe End Module.

Three types of Probe End Module 1000 are disclosed although the scope of this invention is not limited to these three types but includes all types of Probe End Module 1000:
  0-axis
  1-axis
  Hybrid 0/1-axis Referring again to FIG. 1, the Probe End Module 1000 is 0-axis and is a module between the Robot CMM Arm 1 and one or more Probes 90 preferably a Touch Trigger Probe 96 and a Stripe Probe 97. Referring now to FIG. 4, the 1-axis Probe End Module 1000 is a module between the Arm Interface 1001 and Probe Interfaces 1002, 1003 to one or more Probes 90 such as a Touch Trigger Probe 96 and a Stripe Probe 97 such that all Probes 90 rotate on an axis through CMMJoint7 27,57 contained within the Probe End Module 1000. Referring now to FIG. 5, the Hybrid 0/1-axis Probe End Module 1000 is a module between the Arm Interface 1001, fixed Contact Probe Interface 1002 and rotating Optical Probe Interface 1003, such that at least one Probe 90 can rotate about a CMMJoint7 57 contained within the Probe End Module 1000. Contact Probe Interface 1002 is located on CMMSegment7 37. Optical Probe Interface 1003 is located on CMMSegment8 38. A through-bore slip-ring is provided comprising static Slip-ring 1005 and rotating Brush block 1006 so that power, signals and communication networks can be continually fed through to a Probe 90 attached via Optical Probe Interface 1003 undergoing unlimited rotation about CMMJoint7 57. An electronics module 1010 is contained in Probe End Module 1000 and has a number of tasks including encoder signal processing, motor drive, trigger connections and probe communications. The electronics module 1010 is connected to the Robot CMM Arm 1 via a connector 1011 in the Arm Interface 1001 of the Probe End Module 1000. The electronics module 1010 is connected to a fixed Probe 90 via a connector 1012 in the Contact Probe Interface 1002 of the Probe End Module 1000. The electronics module 1010 is connected to a rotating Probe 90 via the slip-ring 1005 and brush lock 1006 to a connector 1013 adjacent to the Optical Probe Interface 1003 of the Probe End Module 1000.

Figure 6:
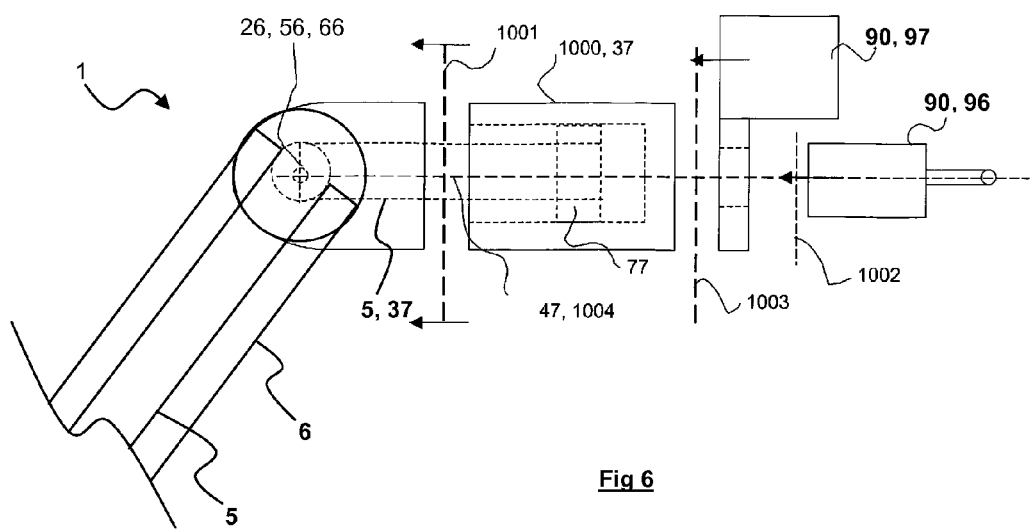
FIG. 6 depicts the Probe End Module 1000 of FIG. 1.

FIG. 6 depicts the Probe End Module 1000 of FIG. 1, showing the Robot CMM Arm 1 in more detail that comprises a movable position reporting device that is an Internal CMM Arm 5, and the movable member (robot) is the automated exoskeleton 6 that supports the movable position reporting device, terminating at CMMSegment7 37.

CMMJoint7 27,57 contained within Probe End Module 1000 can be driven externally or internally. Referring again to FIG. 4, the Probe End Module 1000 is driven externally through TransmissionMeans8 78 by ExoskeletonSegment8 48. It is a purpose of this invention to provide an internally driven 1-axis or Hybrid 0/1-axis Probe End Module 1000. Referring again to FIG. 5, the Probe End Module 1000 is driven internally without an Exoskeleton by Motor 1007 attached to CMMSegment 37 through a spur gear 1008 which is also TransmissionMeans8 78 to a gear ring 1009 on CMMSegment8 38.

The concept of the Probe End Module 1000 mounted between a Robot CMM Arm 1 and one or more Probes 90 is not limited to the embodiments disclosed above. For example, it is applicable to the mounting of one or more tools 98 or any combination of measuring probes 90 and tools 98. The 1-axis and Hybrid 0/1-axis Probe End Module 1000 is not limited to provision on Robot CMM Arms 1. For example, the 1-axis and Hybrid 0/1-axis Probe End Module 1000 can also be provided on conventional 3-axis CMMs such as moving gantry or horizontal arm CMMs; it can also be provided on accurate robots. Any of the interfaces 1001,1002,1003 may be fixed with strong fixings, sacrificial/breakable fixings that break rather than the Probe End Module being damaged, or magnetic force. Fixings can be provided in a standard arrangement to fit with the wrist design of the machine on which the Probe End Module 1000 is to be mounted; or in non-standard arrangements; or in a flexible design in which it can be mounted in 2 or more different ways. A central fixing can be provided or multiple fixings towards and around the perimeter of the mounting face. Fixings can be non-repeatable or repeatable. Contact Probe Interface 1002 and Optical Probe Interface 1003 can be provided with automatic clamping and unclamping means for probe autochanging. Other drive means may be used instead of the motor with spur gear and ring gear. The 1-axis Probe End Module 1000 can be positioned to any programmed angle to the resolution limits of the system; alternatively the Probe End Module 1000 can be provided with increments such as 15 degs at which it locks in position to a high repeatability; these increments can be datumed. Encoder means are provided for measuring the angle of the CMMJoint7 within the Probe End Module 1000. Connectors 1011, 1012, 1013 may automatically make electrical contact with the Robot CMM Arm 1 or Probe 90 when an interface 1001, 1002, 1003 is mechanically made. Alternatively Connectors 1011, 1012, 1013 may be manually made in a separate operation. Markings for the angle of rotation may be made either side of the rotating boundary if the 1-axis Probe End Module 1000, to enable a user to see approximately what angle the axis has rotated to. The Probe End Module 1000 can contain sensors that will cause an emergency stop on sensing an impact and thereby limit damage. The Probe End Module 1000 can be provided with a curved shape to minimise damage caused in impact by encouraging a sliding movement between the surface of the Probe End Module 1000 and the object with which it is in collision. The scope of the Probe End Module 1000 concept includes Robots, CMMs and Probe End Systems based on the concept of the Probe End Module 1000. The scope of the Probe End Module 1000 concept is not limited to apparatus but also includes methods of mounting and using the Probe End Module 1000.

The invention claimed is:
1. A probe end module system comprising:
  a Robot Co-ordinate Measurement Machine Arm (1) comprising a movable member and a movable position reporting device;
  and further comprising:
  a probe end module (1000) having an arm end and an opposing probe end;
  wherein the probe end module comprises:

a module-arm interface (1001) located at said arm end for dismountable attachment to the Robot Co-ordinate Measurement Machine Arm (1);

at least one module-probe interface (1003) located at said probe end for dismountable attachment to a measuring probe; and a first connector (1011) in the module-arm interface (1001) and a second connector (1012) in the module-probe interface (1003) to establish electrical connection between said Robot Co-ordinate Measurement Machine Arm (1) and said measuring probe, wherein the module-probe interface (1003) is rotatably connected to the module-arm interface (1001) by means of one axis of rotation, or by a series of two axes of rotation.

2. System in accordance with claim 1 wherein:

said probe end module (1000) is rigidly attached to said movable positioning reporting device; and said probe end module (1000) is in non-rigid contact with said movable member.

3. System in accordance with claim 1 wherein:

said probe end module (1000) is rigidly attached to said movable positioning reporting device; and said probe end module (1000) is rigidly attached to said movable member.

4. System in accordance with claim 1 further comprising one or more measuring probes (96, 97) rigidly attached to said at least one module-probe interfaces (1002, 1003).

5. System in accordance with claim 4 wherein said one or more measuring probes (96, 97) are selectable from the following measuring probe types: quantity measuring probe, hard contact probe, touch trigger contact probe (96), force contact probe, analogue contact probe, non-contact point probe, non-contact stripe probe (97), non-contact area probe.

6. System in accordance with claim 1 further comprising one or more tool probes rigidly attached to said at least one module-probe interfaces (1003).

7. System in accordance with claim 1 wherein at least one of said module-probe interfaces (1003) is rigidly connected to said module-arm interface (1001).

8. System in accordance with claim 1 wherein the attachment of said probe end module to said arm is geometrically repeatable.

9. System in accordance with claim 1 further comprising an automatic probe changer wherein the attachment of a probe to said at least one module-probe interfaces using said automatic probe changer and the release of said probe from said module-probe interface using said automatic probe changer are automated.

10. System according to claim 1 wherein the probe end module further comprises:

a static module-probe interface (1002) located at said probe end such that there is no relative movement between said module-arm interface and said static module-probe interface;

a rotatable module-probe (1002) interface located at said probe end; and an axis of rotation between said module-arm interface and said rotatable module-probe interface.

11. System in accordance with claim 10 further comprising an automatic drive (1007) to automatically drive said axis of rotation.

12. System in accordance with claim 10 further comprising an encoder to provide the angular position of said axis of rotation.

13. System in accordance with claim 10 further comprising an angle definer for the repeatable manual rotation and locking of said axis of rotation in any one of a small number of defined angles.

\* \* \* \* \*